US010958869B1

(12) United States Patent
Chi et al.

(10) Patent No.: US 10,958,869 B1
(45) Date of Patent: Mar. 23, 2021

(54) SYSTEM, DEVICE AND METHOD FOR VIDEO FRAME INTERPOLATION USING A STRUCTURED NEURAL NETWORK

(71) Applicants: Zhixiang Chi, North York (CA); Rasoul Mohammadi Nasiri, Toronto (CA); Zheng Liu, Toronto (CA); Jin Tang, Markham (CA)

(72) Inventors: Zhixiang Chi, North York (CA); Rasoul Mohammadi Nasiri, Toronto (CA); Zheng Liu, Toronto (CA); Jin Tang, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/684,084

(22) Filed: Nov. 14, 2019

(51) Int. Cl.
*H04N 7/01* (2006.01)
*H04N 11/02* (2006.01)
*G06N 3/08* (2006.01)
*H04N 19/587* (2014.01)

(52) U.S. Cl.
CPC ............... *H04N 7/014* (2013.01); *G06N 3/08* (2013.01); *H04N 11/02* (2013.01); *H04N 19/587* (2014.11)

(58) Field of Classification Search
CPC .......... H04N 7/01; H04N 11/02; H04N 7/014; H04N 19/587; H04N 7/0127; H04N 7/0137; H04N 7/0147; G06N 3/08
USPC .................................................. 348/441, 443
See application file for complete search history.

(56) References Cited

U.S. PATENT DOCUMENTS

| 7,103,231 B2* | 9/2006 | Cornog ................... G06T 13/80 |
| | | 348/E5.067 |
| 8,768,103 B2* | 7/2014 | Ogino .................... H04N 7/014 |
| | | 382/300 |
| 9,569,866 B2* | 2/2017 | Bai ........................ G06T 11/001 |
| 9,626,770 B2* | 4/2017 | Taggart ................... G11B 27/10 |
| 10,127,644 B2* | 11/2018 | Taggart .................... G06T 5/40 |
| 10,452,584 B2* | 10/2019 | Sachs .................. G06F 13/4081 |

(Continued)

FOREIGN PATENT DOCUMENTS

| CN | 101719978 A | 6/2010 |
| CN | 109151474 A | 1/2019 |
| WO | 2018170393 A9 | 9/2018 |

OTHER PUBLICATIONS

Reda, Fitsum A., et al. "Sdc-net: Video prediction using spatially-displaced convolution." Proceedings of the European Conference on Computer Vision (ECCV). 2018. 2018.

(Continued)

*Primary Examiner* — Trang U Tran

(57) ABSTRACT

A system, device and method of video frame interpolation. In one aspect, a frame interpolation system receive candidate interpolated frame and difference data based on a first frame and second frame. It identifies a high-error region and one or more increasingly lower-error regions of the candidate interpolated frame based on the difference data and applies multiple successive stages of a refinement neural network to the regions of the candidate interpolated frame, from highest- to lowest-error. At each stage, the results of the previous stage are combined with the next lower-error region before being refined by the current stage. In some aspects, the system also generates the candidate interpolated frame and the difference data using a flow estimation neural network.

20 Claims, 10 Drawing Sheets

(56) References Cited

U.S. PATENT DOCUMENTS

| | | | | |
|---|---|---|---|---|
| 10,540,773 | B2* | 1/2020 | Holzer | G06F 16/783 |
| 2008/0240241 | A1 | 10/2008 | Mishima et al. | |
| 2011/0134315 | A1* | 6/2011 | Levy | H04N 7/0127 |
| | | | | 348/441 |
| 2015/0264385 | A1* | 9/2015 | Ogawa | H04N 19/553 |
| | | | | 375/240.16 |
| 2018/0255290 | A1* | 9/2018 | Holzer | H04N 13/221 |
| 2020/0053388 | A1* | 2/2020 | Schroers | H04N 19/436 |

OTHER PUBLICATIONS

Bao, Wenbo, et al. "MEMC-Net: Motion estimation and motion compensation driven neural network for video interpolation and enhancement." IEEE Transactions on Pattern Analysis and Machine Intelligence (2019). 2019.

Bao, Wenbo, et al. "Depth-aware video frame interpolation." Proceedings of the IEEE Conference on Computer Vision and Pattern Recognition. 2019. 2019.

Niklaus, Simon, and Feng Liu. "Context-aware synthesis for video frame interpolation." Proceedings of the IEEE Conference on Computer Vision and Pattern Recognition. 2018. 2018.

Niklaus, Simon, Long Mai, and Feng Liu. "Video frame interpolation via adaptive convolution." Proceedings of the IEEE Conference on Computer Vision and Pattern Recognition. 2017. 2017.

Simon Niklaus, Long Mai, Feng Liu, "Video Frame Interpolation via Adaptive Separable Convolution", ICCV 2017, arxiv:1708.01692 [cs.CV]. 2017. 2017.

Huaizu Jiang et al., Super SloMo: High Quality Estimation of Multiple Intermediate Frames for Video Interpolation. arXiv:1712.00080v2 [cs.Cv] Jul. 13, 2018, 12 pages 2018.

Haoxian Zhang et al., Multi-Frame Pyramid Refinement Network for Video Frame Interpolation. IEEE Access (vol. 7), Sep. 11, 2019, 12 pages 2019.

* cited by examiner

US 10,958,869 B1

SYSTEM, DEVICE AND METHOD FOR VIDEO FRAME INTERPOLATION USING A STRUCTURED NEURAL NETWORK

TECHNICAL FIELD

The present disclosure relates to video frame interpolation, and in particular, to a system, device and method for video frame interpolation using a structured neural network.

BACKGROUND

Video frame interpolation aims to synthesize a frame of a video as it would appear at a time step between two existing consecutive frames of the video. Given two consecutive frames of a video (a starting frame and ending frame), a video frame interpolation system attempts to synthesize one or more intermediate frames that appear to fill in the transition between the starting and ending frames. FIG. 1A illustrates a video including a starting frame (first frame 102), an ending frame (second frame 104), and an interpolated intermediate frame 106 synthesized by a video frame interpolation system. More generally, video frame interpolation attempts to synthesize an interpolated intermediate frame 106 that includes an image that represents a transition between two consecutive frames in a video.

Recent approaches to video interpolation use machine learning models to synthesize intermediate frames based on inputs of a first frame and second frame. A machine learning model may be trained by feeding inputs with known desired outputs—for example, frames and 3 of an existing video may be used as inputs, with the output of the machine learning model compared to frame 2. This comparison generates an error function indicating the degree to which the model's output diverges from the desired output. The results of this comparison are fed into the model and used to adjust parameters within the model. After training the model on a sufficiently large data set, the parameters of an effectively designed model are tuned to generate output that closely matches the desired output, i.e. when fed frames 1 and 3 the model will interpolate an intermediate frame that closely matches frame 2.

Recent approaches to video frame interpolation are typically either vector-based or kernel-based. Vector-based approaches rely on the estimation of the bidirectional dense optical flow from a pair of consecutive frames. Then, using the estimated optical flow between the pair of consecutive frames of a video, pixel remapping is performed to synthesize new interpolated intermediate frames. An interpolated intermediate frame is typically generated based on the following formula:

$$I_t(x,y) = m \cdot I_1(x-u, y-v) + (1-m) \cdot I_2(x,y)$$

Where $I_1$ and $I_2$ are the starting and ending frames, $I_t$ is the interpolated intermediate frame, x and y are pixel coordinates, in is the blending mask, and u and v are the optical flow vector.

As an alternative to vector-based approaches, kernel-based approaches synthesize the pixels of the interpolated intermediate frame by convolving any input patches from the pair of consecutive frames of a video with predicted spatially adaptive kernels. Specifically, for each pixel in the target interpolated intermediate frame, the kernel-based approach generates a kernel, for example a rectangular 41×41 matrix. Finally, the pixel value in the output interpolated intermediate frame 106 is calculated by applying the kernel on the neighborhood of the starting and ending frame pixel using the dot product.

The basic operation of kernel-based and vector-based approaches are illustrated in FIG. 1B. A vector-based video frame interpolation approach 120 generates a pixel (x,y) 126 of the interpolated intermediate frame $I_{t+1}$ 106 by applying optical flow vector (u,v) 122 to derive an interpolated pixel value based on a corresponding pixel value at (x+u,y+v) 124 of the starting frame $I_t$ 102. Thus, $I_{t+1}(x,y) = f(I_t(x+u,y+v))$.

The kernel-based video frame interpolation approach 130 instead generates a pixel (x,y) 136 of the interpolated intermediate frame $I_{t+1}$ 106 by applying the kernel K(x,y) 132 by dot product to the neighborhood P(x,y) 138 of the pixel (x,y) 134 of the starting frame $I_t$ 102. Thus, $I_{t+1}(x,y) = K(x,y) \cdot P(x,y)$.

These existing approaches to video frame interpolation exhibit a number of shortcomings. Vector-based approaches heavily rely on the accuracy of the estimated optical flow, but the estimation of optical flow is necessarily imperfect, especially when dealing with disocclusions, large motions, and repetitive patterns. Recent work on vector-based approaches focuses on improving optical flow generated by machine learning based models that use side information such as edge, depth, and contexture information. Those types of information can help to improve the quality of the interpolated intermediate frame 106 generated by such machine learning based models, but such models normally require high computational cost and include a very large number of parameters that are required to be learned. Sometimes the tradeoff between cost and gain is imbalanced: using a machine learning based model with a large number of learned parameters can only improve the quality of the interpolated intermediate frame 106 by a small margin. Thus, heavy models (i.e. those with a large number of parameters) may in some applications be inferior to light models (i.e. models with few parameters, also called "lite-weighted" models) because of the diminishing returns on resources used to train and run the model.

Recent kernel-based approaches generally generate one kernel for each pixel in the target interpolated intermediate frame, and consequently require a large memory. For example, to generate the kernels for all pixels in a frame of a 1080p video (e.g. a frame that includes 1920×1080 pixels), a kernel-based approach requires 26 GB of memory for data generated by the kernel-based approach. Moreover, the size of the kernel limits the capability of capturing large motions.

Furthermore, existing vector-based approaches use optical flow only to generate initial warped intermediate interpolated frames, while the underlying optical flow information is not fully exploited. Optical flow provides a strong prior knowledge regarding motion complexity which is directly related to the performance of interpolation processes. Given a video, the variant motion complexities across the frames of the video yield non-uniform distributions of error for frame interpolation.

In view of the foregoing, improvements to video frame interpolation methods are desirable.

SUMMARY

The present disclosure provides a system, device and method for video frame interpolation. A candidate interpolated intermediate frame is segmented into regions having varying levels of estimated interpolation error. Each region is refined separately, and the refined regions are combined to create a final interpolated intermediate frame.

In accordance with a first aspect of the present disclosure, there is provided a computing system. In accordance with one embodiment of the first aspect of the present disclosure, the computing system comprises a processor system and a memory coupled to the processor system, the memory tangibly storing thereon executable instructions of a video frame interpolation system. The instructions, when executed by the processor system, cause the frame interpolation system to receive a candidate interpolated intermediate frame, receive difference data, identify a high-error region and one or more increasingly lower-error regions of the candidate interpolated frame based on the difference data, refine each of the high-error and increasingly lower-error regions separately to produce refined region data, and generate refined interpolated intermediate frame data for a refined interpolated intermediate frame based on the refined region data.

According to another aspect, there is provided a frame interpolation method. A candidate interpolated frame is received. Difference data is received. A high-error region and one or more increasingly lower-error regions of the candidate interpolated frame are identified based on the difference data. Each of the high-error and increasingly lower-error regions are refined separately to produce refined region data. Refined interpolated frame data is generated based on the refined region data.

According to a further aspect, there is provided a non-transitory processor readable medium having tangibly stored thereon executable instructions that, when executed by a processor, cause the processor to perform the frame interpolation method.

According to some embodiments of the previous aspects and embodiments, the difference data comprises an optical flow map, and identifying the high-error region and the one or more increasingly lower-error regions comprises generating a high-motion mask corresponding to a region of the optical flow map having optical flow magnitude over a predetermined highest optical flow threshold, and generating one or more lower-motion masks corresponding to one or more regions of the optical flow map having optical flow magnitude over one or more predetermined lower optical flow thresholds.

According to some embodiments of the previous aspects and embodiments, the difference data further comprises an occlusion map, and identifying the high-error region and the one or more increasingly lower-error regions further comprises generating a warped high-motion mask and one or more warped lower-motion masks based on warping the high-motion mask and the one or more lower-motion masks, respectively, using the optical flow map, generating a combined high-motion mask and one or more combined lower-motion masks based on a union of the high-motion mask and one or more lower-motion masks, respectively, with the warped high-motion mask and one or more warped lower-motion masks, respectively, detecting one or more occluded regions of the candidate interpolated frame based on the occlusion map, the high-error region based on the combined high-motion mask, further including the one or more occluded regions, and identifying the one or more low-error regions based on the one or more combined lower-motion masks.

According to some embodiments of the previous aspects and embodiments, generating the combined high-motion mask and the one or more combined lower-motion masks further comprises applying dilation to a boundary of each combined mask based on the optical flow map.

According to some embodiments of the previous aspects and embodiments, warping a mask using the optical flow map to generate a warped mask comprises copying the value of each pixel in the mask to generate the value of a corresponding pixel, based on an optical flow vector of a corresponding coordinate of the optical flow map, of the warped mask.

According to some embodiments of the previous aspects and embodiments, the instructions, when executed by the processor system, further cause the frame interpolation system to use a flow estimation neural network to generate the candidate interpolation frame, the optical flow map, and the occlusion map.

According to some embodiments of the previous aspects and embodiments, using the flow estimation neural network to generate the candidate interpolation frame, the optical flow map, and the occlusion map comprises several steps. A base-resolution first frame is generated based on a first frame and a base-resolution second frame based on a second frame. S first stage of the multi-stage cascading flow estimation neural network is used to: generate a base-resolution optical flow map based on the base-resolution first frame and base-resolution second frame; and generate a base-resolution occlusion map based on the base-resolution first frame and base-resolution second frame. One or more pairs of increasingly higher-resolution first and second frames are generated based on the first frame and second frame respectively. Each of one or more subsequent stages of the multi-stage cascading flow estimation neural network is applied to each of the pairs of increasingly higher-resolution first and second frames by generating a first warped frame by warping the higher-resolution first frame using the optical flow map generated using the previous flow estimation neural network stage, generating a second warped frame by warping the higher-resolution second frame using the optical flow map generated using the previous flow estimation neural network stage, generating a higher-resolution optical flow map based on the first warped frame and second warped frame, and generating a higher-resolution occlusion map based on the first warped frame and second warped frame. Once a final stage of the multi-stage cascading flow estimation neural network has been applied to generate a final first warped frame, final second warped frame, final optical flow map, and final occlusion map, the candidate interpolated frame is generated by fusing the final first warped frame and the final second warped frame using the final occlusion map as a blending map. The optical flow map is generated based on the final optical flow map. The occlusion map is generated based on the final occlusion map.

According to some embodiments of the previous aspects and embodiments, refining each of the high-error and increasingly lower-error regions comprises applying a high-error stage of a refinement neural network to a high-error portion of the candidate interpolated frame data corresponding to the high-error region, thereby generating refined region data; and, for each increasingly lower-error region: generate combined region data based on the refined region data and a lower-error portion of the candidate interpolated frame data corresponding to the lower-error region, and apply an increasingly lower-error stage of the refinement neural network to the combined region data to re-generate the refined region data.

The embodiments described herein may address one or more of the shortcomings of the prior art. Refinement can be focused on regions of high estimated interpolation error, thereby potentially saving resources and avoiding the introduction of artifacts into lower-error regions. Problems caused by optical flow estimation in some known techniques, such as shadows being created near motion boundaries, can be avoided. The refinements techniques described herein can stand on their own, potentially being applied to optical flow data created by other methods than those described herein. And the methods described herein for motion mask generation can be carried out without any additional parameters.

Overall, the described systems and methods can improve video motion smoothness if frames are missing from a video recording or video stream (such as video streamed over a network connection). Frame rate can be improved, thereby improving visual quality and user experience. And the performance of post-processing slow-motion applications can be improved through the efficiencies realized by the described techniques.

DESCRIPTION OF EXAMPLE EMBODIMENTS

Figure 1A:
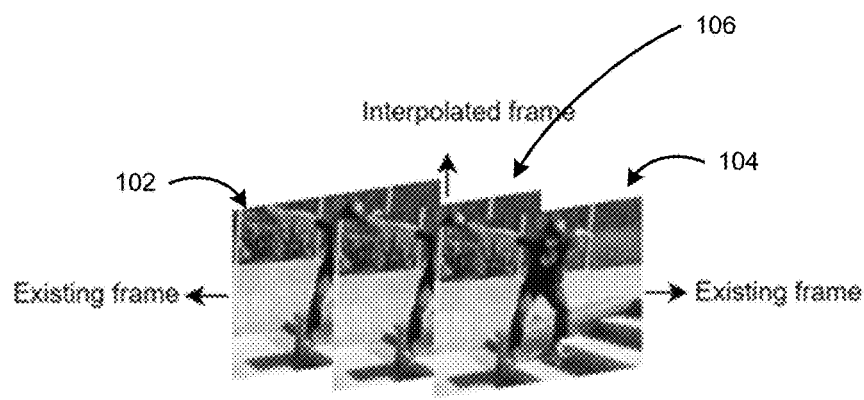
FIG. 1A is a diagram showing a video that includes a starting frame, an interpolated intermediate frame, and an ending frame.
Figure 1B:
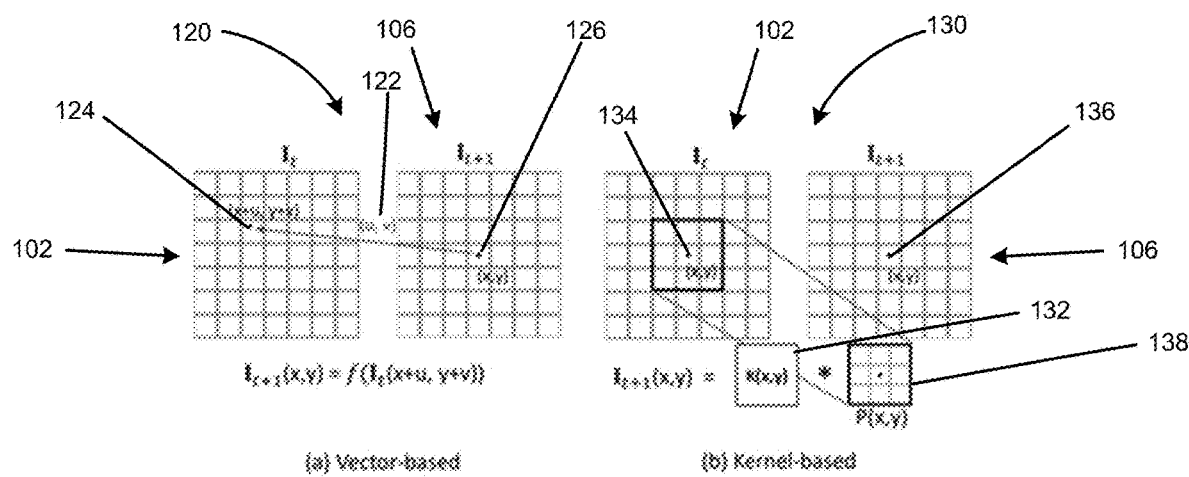
FIG. 1B is a diagram of a vector-based method for video frame interpolation and a kernel-based method of video frame interpolation.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

For convenience, the present disclosure describes example embodiments of methods and systems with reference to video frame interpolation. The described methods and systems can be deployed to synthesize a new intermediate interpolated frame between two existing frames of a video. However, the methods and systems described herein could also potentially be applied to interpolation between two consecutive images from a source other than a video. For example, the frames could be any two images from the source with spatially close views taken from the same scene with a temporal relation.

Generally, the described methods and systems could potentially be used for any frame or sub-frame interpolation task. One application could be video inpainting, where a region in a frame or collection of frames is missed (due to logo-removal, watermarking, etc.) in a specific time interval of video, with the described methods and systems used to reconstruct the missing or occluded frame region. The described video frame interpolation methods and systems can be used to estimate the value of pixels in the target region by considering levels of error.

The methods and systems can also potentially be used for correction of some noise or errors during video streaming, for example, when one frame or some consecutive frames of a video are lost during streaming of the video. Predicting levels of errors in the method of the present disclosure can also be used for video compression processes for achieving the best rate-quality control.

Computing bidirectional optical flow in a video can assist in video frame interpolation. Optical flow is the pattern of apparent motion of objects between two frames. In frame interpolation, optical flow between the first frame and second frame can be represented by a two-dimensional vector field called an optical flow map, with the vector at each coordinate of the optical flow map indicating the apparent motion of the pixel in the corresponding coordinate of the first frame during the transition to the second frame. Similarly, a backward optical flow map may be generated by mapping the vectors of apparent movement of each pixel in the second frame during the transition backward to the first frame. Experimental results described below indicate that optical flow magnitude and interpolation errors are highly correlated. Thus, refinement of a candidate interpolated intermediate frame can be focused on frame regions with high interpolation error by segmenting frame regions based on computed optical flow, using a motion adaptive refinement neural network (MAR-Net) as described herein. Those regions with a high level of error are normally hard to optimize across the whole frame; however, use of a motion-controlled loss function may be able to address this problem.

The described methods and systems aim to target the refinement of the high error region(s), making it potentially more effective and efficient than existing kernel based and vector based approaches. Thus, a significant improvement in synthesizing interpolated intermediate frames relative to existing approaches may potentially be achieved while using a machine learning based model for video frame interpolation with small model size and a small number of parameters.

Figure 2:
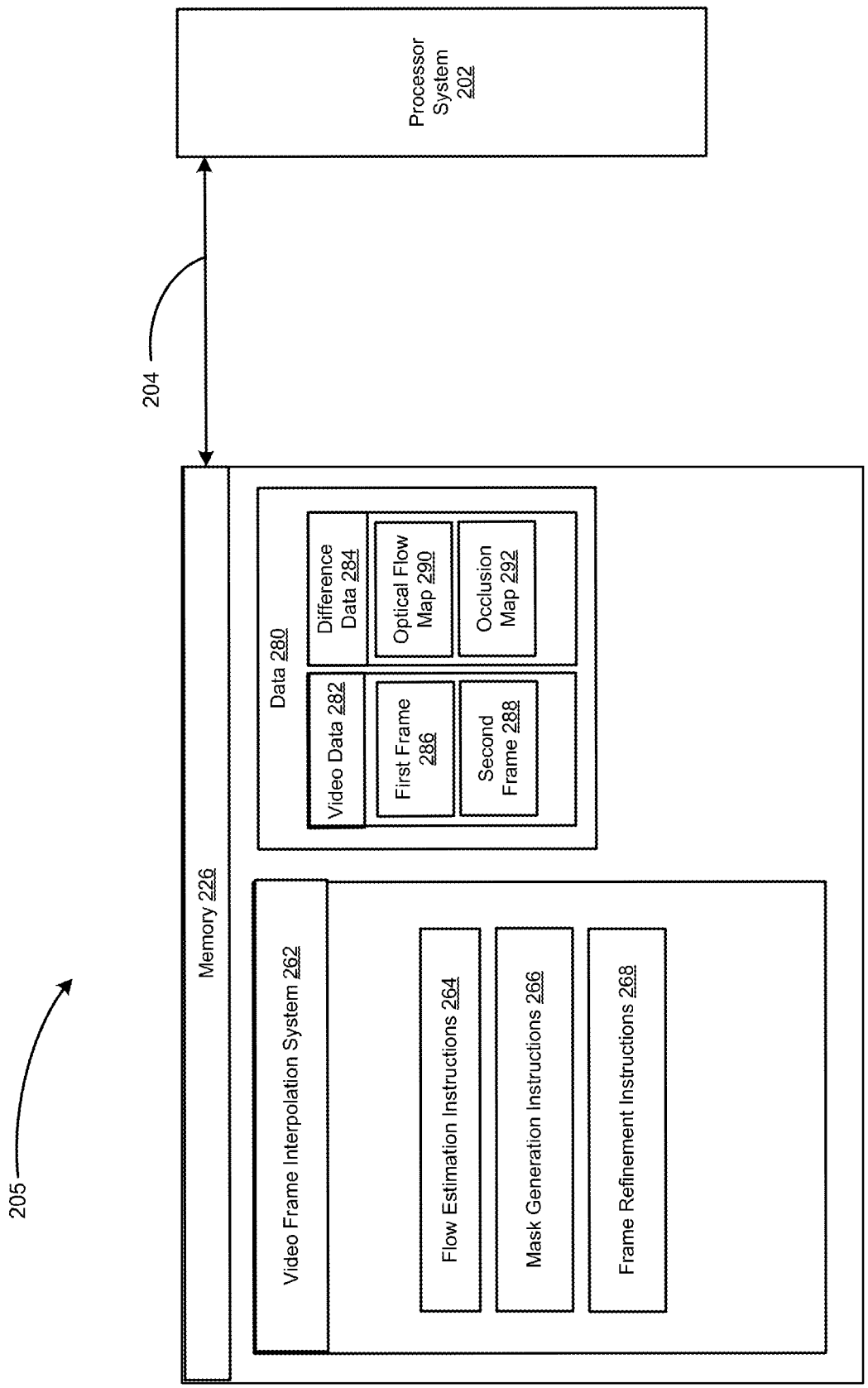
FIG. 2 is a block diagram of a computing system implementing a video frame interpolation system in accordance with one example embodiment of the present disclosure.

FIG. 2 illustrates selected components of a computing system 205 in accordance with an example embodiment of the present disclosure. The computing system 205 may in various embodiments be a physical computer (i.e., physical machine such as a desktop computer, a laptop, a server, etc.) or a virtual computer (i.e., virtual machine) provided by, for example, a cloud service provider. As shown in FIG. 2, the computing system 205 includes a processor system 202 that is coupled to a memory 226 via a communication bus or communication link 204 which provides a communication path between the memory 226 and the processor system 202. In some embodiments, the memory 226 may be a Random Access Memory (RAM), Read Only Memory (ROM), persistent (non-volatile) memory such as flash erasable programmable read only memory (EPROM) (flash memory. The processor system 202 may include one or more processing units, including for example one or more central processing units (CPUs), one or more graphical processing units (GPUs), one or more tensor processing units (TPUs), and other processing units. The processing system 202 may also include one or more hardware accelerators.

In some embodiments, the processing system 202 may also be coupled to one or more communications subsystems (not shown) for exchanging data signals with a communication network, and/or one or more user interface subsystems (not shown) such as a touchscreen display, keyboard, and/or pointer device. The touchscreen display may include a display such as a color liquid crystal display (LCD), light-emitting diode (LED) display or active-matrix organic light-emitting diode (AMOLED) display, with a touch-sensitive input surface or overlay connected to an electronic controller. Alternatively, the touchscreen display may include a display with touch sensors integrated therein.

Figure 3:
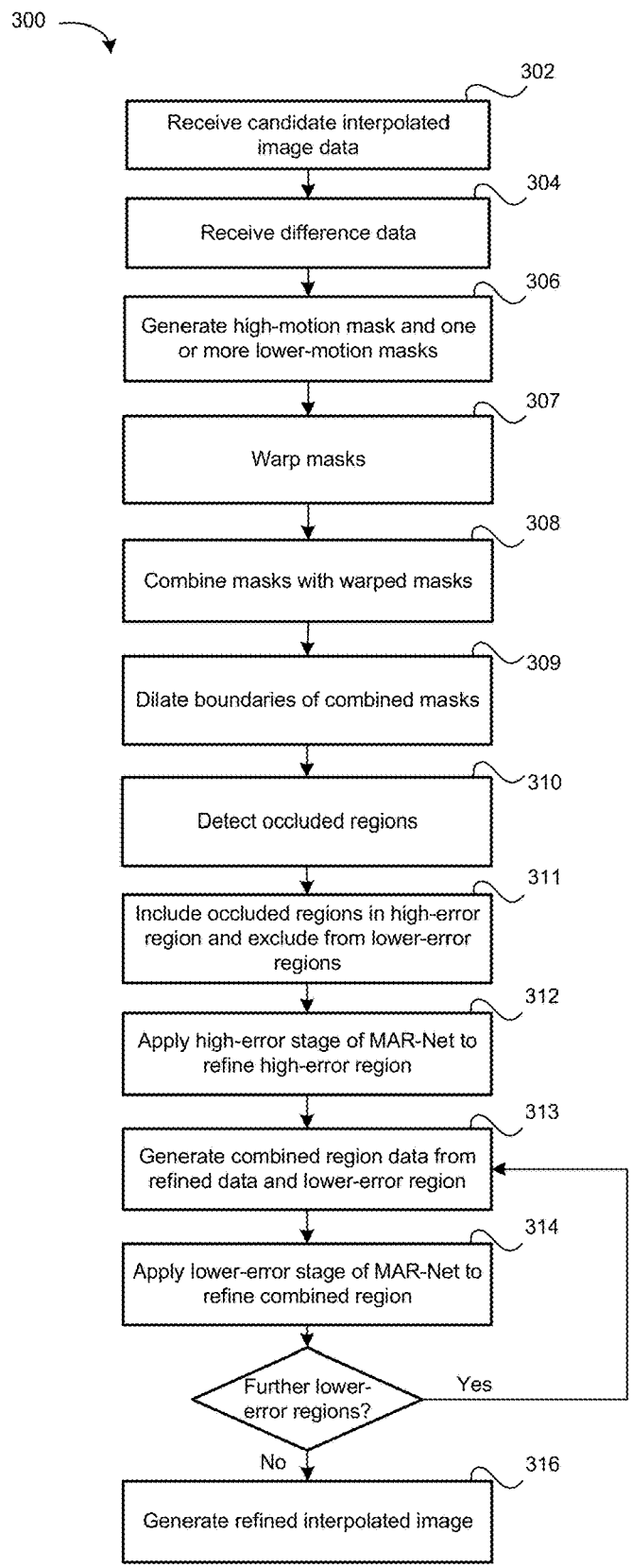
FIG. 3 is a flowchart showing the operation of a candidate interpolated intermediate frame refinement method used by a video frame interpolation system in accordance with one example embodiment of the present disclosure.

The memory 226 of the computing system 205 has stored thereon instructions of software systems, including a video frame interpolation system 262, which may be executed by the processor system 202. The instructions of the frame interpolation system 262, in various embodiments, include one or more of flow estimation instructions 264, mask generation instructions 266, and/or refinement instructions 268. The flow estimation instructions 264 cause the processor system 202 to execute a flow estimation method 700 as further described below and at FIG. 7. The mask generation instructions 266 cause the processor system 202 to execute a mask generation method 500 as further described below and at FIG. 5. The refinement instructions 268 cause the processor system 202 to execute a frame refinement method 300 as further described below and at FIG. 3.

The memory 226 also stores a variety of data 280. The data 280 may comprise video data 282 (i.e., data representative of a video), including data representative of a first frame of the video (hereinafter referred to as first frame 286) and data representative of a second frame of the video (hereinafter referred to as second frame 288). The first frame 286 and the second frame 288 are a pair of consecutive frames of the video. Data 280 may also comprise difference data 284 generated based on calculated differences between a first frame 286 and second frame 288, such as data representative of an optical flow map (hereinafter referred to optical flow map 290) and a data representative of an occlusion map (hereinafter referred to as occlusion map 292). System software, software modules, specific device applications, or parts thereof, may be temporarily loaded into a volatile storage, such as RAM of the memory 226, which is used for storing runtime data variables and other types of data and/or information. Data received by the video frame interpolation system 262 may also be stored in the RAM of the memory 226. Although specific functions are described for various types of memory, this is merely one example, and a different assignment of functions to types of memory may also be used.

The computing system 205 may be a single device, for example a collection of circuits housed within a single housing. In other embodiments, the computing system 205 may be distributed across two or more devices or housings, possibly separated from each other in space. The communication bus may comprise one or more communication links or networks.

Frame Interpolation—Refinement Neural Network

The video frame interpolation system 262 comprises a refinement neural network to refine a candidate interpolated intermediate frame 352. In some embodiments, the refinement neural network may be a motion-adaptive refinement network, or MAR-Net 400.

The example embodiments described herein make reference to a refinement neural network. However, it will be appreciated that other machine learning techniques may be used to learn other machine learning based models to perform the candidate interpolated intermediate refinement method 300 described below.

As noted above, the memory 226 has tangibly stored thereon executable video frame interpolation system 262. When the instructions of the video frame interpolation system 262 are executed by the processor system 202, they cause the video frame interpolation system 262 to execute a candidate interpolated intermediate frame refinement method 300, shown in the flowchart of FIG. 3, to generate an refined interpolated intermediate frame as described in further detail below.

The video frame interpolation 262 at step 302 receives candidate interpolated frame data representative of a candidate interpolated intermediate frame 352 of a video synthesized from the first frame 286 and second frame 288. At step 304, the video frame interpolation 262 receives difference data 284 determined based on the first frame 286 and second frame 288. In some embodiments the difference data 284 may include the optical flow map 290 and/or occlusion map 292. In some embodiments, the optical flow map 290 may be a 2-dimensional occlusion map corresponding in size to the first frame 286 and second frame 288, with each pixel coordinate of the 2-dimensional optical flow map 290 being a two-dimensional motion vector. In some embodiments, the optical flow map 290 is a bidirectional optical flow map comprising a forward optical flow map and a backward optical flow map. The forward optical flow map corresponds to the anticipated motion vectors from the starting frame ($I_1$) to the interpolated frame ($I_t$), and the backward optical flow map corresponds to the anticipated motion vectors from the ending frame ($I_2$) to the interpolated frame ($I_1$).

The candidate interpolated frame data and difference data 284 may be received over the communication bus 204 from the memory 226.

The video frame interpolation system 262 identifies or estimates a high-error region and one or more increasingly lower-error regions of the candidate interpolated frame 352 based on the difference data 284. These regions are subsequently used to successively refine the errors in the candidate interpolated frame 352, from coarse (high-error) through fine (lowest-error). The error levels of these regions refers to their respective levels of estimated interpolation error.

If the difference data 284 includes optical flow map data 290, the video frame interpolation system 262 may identify these regions through a series of operations using the optical flow map data 290. At step 306, the video frame interpolation system 262 generates a high-motion mask 380 corresponding to a region of the optical flow map 290 having optical flow magnitude over a predetermined highest optical flow threshold, and generates one or more lower-motion masks corresponding to one or more regions of the optical flow map 290 having optical flow magnitude over one or more predetermined lower optical flow thresholds. In some embodiments, these masks are binary masks corresponding to the size of the first frame 286 and second frame 288.

Typically, the lowest-error mask used to identify the lowest-error region will be generated using an optical flow threshold with a low value.

In an example embodiment having a high-error, middle-error and low-error stage used to refine high-, middle- and low-error regions respectively, the high-motion mask may be generated by identifying pixel coordinates of the optical flow map 290 having an optical flow vector magnitude over a predetermined high optical flow threshold. Similarly, the middle-motion mask (i.e. the first lower-motion mask) is generated by identifying pixel coordinates of the optical flow map 290 having a vector magnitude between the high optical flow threshold and a low optical flow threshold, and the low-motion mask (second lower-motion mask) is generated by identifying pixel coordinates of the optical flow map 290 having a vector magnitude below the low optical flow threshold.

Alternatively, some embodiments may generate the masks in an overlapping manner: each lower-error mask would include those regions included in the high-motion mask and each prior lower-error mask. This would require corresponding modification to the order and details of the combination operation described below but would not affect the final results of the video frame interpolation system 262, as successive refinement operations would still be applied to a combined region of the candidate interpolation frame 352 incorporating the results of previous stages of refinement as well as the current lower-error region.

Some embodiments further apply the optical flow map 290 to warp the masks from step 306. At step 307, the masks generated at step 306 (the high-motion mask and the one or more lower-motion masks) are warped using the optical flow map, thereby generating warped versions of each such mask (a warped high-motion mask and one or more warped lower-motion masks). At step 308, the original masks are combined with the warped versions thereof to generate combined versions of those masks (combined high-motion mask 388 and the one or more combined lower-motion masks, such as combined middle-motion mask 490 and combined low-motion mask 492 shown in FIG. 4). The original and warped masks may in some embodiments be combined by a union operation (logical OR) of their respective pixels. The combined masks 388,490,492 are used to identify the high-error region and lower-error regions.

In some embodiments, generating the combined high-motion mask 388 and one or more combined lower-motion masks 490, 492 further comprises applying dilation to a boundary of each combined mask 388, 490, 492 based on the optical flow map 290 at step 309.

If the difference data 284 includes the occlusion map 292, the video frame interpolation system 262 may detect one or more occluded regions of the candidate interpolated intermediate frame based on the occlusion map 292 at step 310. Optical flow may be less accurate in occluded regions. Thus, occluded regions may be classified as high-error regardless of optical flow in those regions. Thus, at step 311, the high-error region is identified at least in part by including the one or more occluded regions, while the lower-error regions are identified at least in part by excluding the one or more occluded regions. Where the difference data 284 includes both an optical flow map 290 and the occlusion map 292, identifying the regions may comprise the union of the occluded regions with the combined high-motion mask 388 to identify the high-error region and excluding the occluded regions from each of the combined lower-motion masks 390 to identify each of the lower-error regions.

At step 312, the video frame interpolation system 262 applies a high-error stage 362 of a refinement neural network to a high-error portion of the candidate interpolated frame data corresponding to the high-error region 354, thereby generating refined region data 370.

For each increasingly lower-error region, the video frame interpolation system 262 applies a series of steps 313, 314. At step 313, the video frame interpolation system 262 generates combined region data (such as combined high- and middle-error region data 494) based on the refined region data 370 and a lower-error portion of the candidate interpolated frame data corresponding to the lower-error region (such as middle-error region 357). At step 314, the video frame interpolation system 262 applies an increasingly lower-error stage of the refinement neural network to the combined region data (e.g. combined high- and middle-error region data 494) to re-generate the refined region data 370. These steps 313, 314 are repeated for each lower-error region of the candidate interpolated intermediate frame 352 identified at step 306. Thus, in a the video frame interpolation system 262 that includes a three-stage refinement neural network, step 306 identifies one high-error region 354 and two lower-error regions (for example, a middle-error region 357 and a low-error region 358). Such a video frame interpolation system 262 would apply the high-error stage 362 of the refinement neural network to the high-error region 354 at step 308 and repeat steps 313, 314 two times: the video frame interpolation system 262 would apply a lower-error stage (e.g. a middle-error stage 365) to the middle-error region 357 (combined with the previous refined region data 370 from the high-error stage 362) and then a further lower-error stage (e.g. a low-error stage 366) to the low-error region 358 (combined with the previous refined region data 370 from the middle-error stage 365).

At step 316, the video frame interpolation system 262 generates refined interpolated intermediate frame data based on the refined region data 370. The refined interpolated intermediate frame data is representative of a final refined interpolated intermediate frame 376 intended to represent an synthesized frame located between the first frame 286 and second frame 288.

Various steps of the described methods make reference to warping. Warping may be accomplished in some embodiments by copying the value of each pixel or pixel coordinate in a mask, map or frame to generate the value of a corresponding pixel or pixel coordinate, based on an optical flow vector of a corresponding coordinate of the optical flow map 290.

Figure 4:
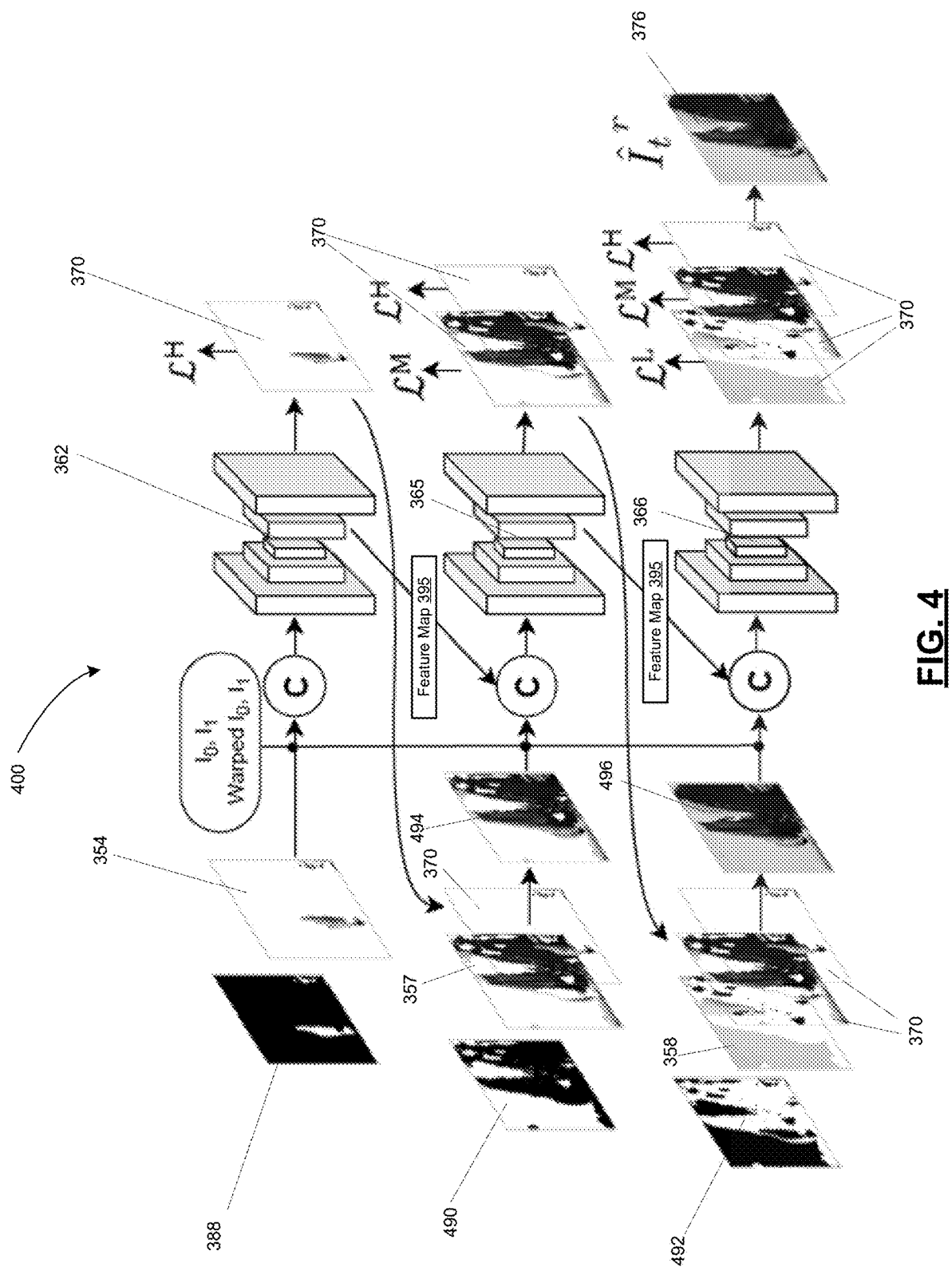
FIG. 4 is a diagram showing the operation of the candidate interpolated intermediate frame refinement method of FIG. 3 in accordance with one example embodiment of the present disclosure.
Figure 8:
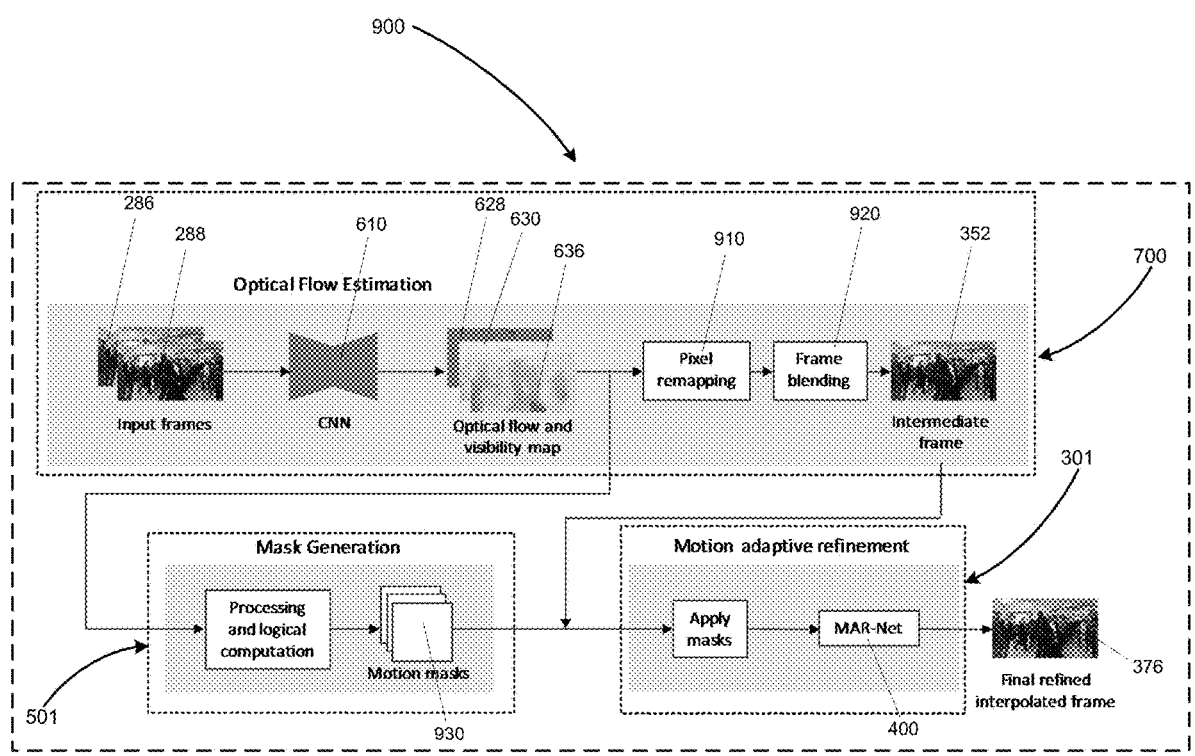
FIG. 8 is a diagram of a video frame interpolation system that includes a FE-Net and a MAR Net in accordance with one example embodiment of the present disclosure.

An example embodiment of operation of the candidate interpolated intermediate frame refinement method performed by MAR-Net 400 illustrated in FIG. 8 is shown in FIG. 4. In this example embodiment, the candidate interpolated intermediate frame 352 (as shown in e.g. FIG. 6) shows a person's torso and hands: the background is static while the torso moves slightly between the starting and ending frame, and the hands move rapidly, resulting in a high-motion region around the hands, a middle-motion region including the hands and most of the torso, and a low-motion region including the hands, the torso, and the background.

Having the frames spatially segmented according to their respective motion levels (by using masks) allows the MAR-Net 400 to refine these regions with different mechanisms. As the low-motion regions usually manifest a lower level of error in frame interpolation, applying a deeper refinement network may deteriorate performance. In contrast, high-motion regions are more likely to have high interpolation error, therefore yielding significant room for improvement through refinement. However, instead of applying three individual networks for processing three masks based on level of motion, this implementation of the MAR-Net 400 embeds an adaptive refinement pipeline within a single network to benefit from information sharing among regions (i.e. the three levels or stages 362, 365, 366 of the refinement neural network such as MAR-Net 400).

The Motion Adaptive Refinement Network (MAR-Net) 400 includes three stages 362, 365, 366. The first stage 362 starts to refine the high motion region, and then the mid and low motion regions join the refinement process at the second 365 and third 366 stages. The output of each stage is passed to the subsequent stage for further refinement. Moreover, because each stage generates feature maps 395 based on filtering the image data input (e.g., the first stage 362 generates feature maps of the high motion region), and these feature maps 395 are used to generate the refined region data, the feature maps 395 may also be passed to the next stage as an additional input to avoid the need to redundantly calculate these feature maps 395 for the previously-refined regions. By inheriting the high-level feature representations of the higher motion regions, the second and third stages can avoid computing them redundantly. Thus, the current stage can better focus on refining the specified region, and also provides auxiliary error reduction on the other regions.

FIG. 4 does not show the steps of generating the masks. Instead, the MAR-Net 400 receives as inputs a final high-error mask, shown here as combined high-motion mask 388 and one or more combined lower-motion masks (shown here as combined middle-error mask 490 and combined low-error mask 492), as well as the candidate interpolated intermediate frame 352 (shown in FIG. 6). The combined high-motion mask 388 is applied to the candidate interpolated intermediate frame 352 to identify the high-error region 354 of the candidate interpolated intermediate frame 352. The high-error stage 362 of the MAR-NET 400 is applied to the high-error region 354 to generate the refined region data 370.

The combined middle-error mask 490 is applied to the candidate interpolated intermediate frame 352 to identify the middle-error region 357. The middle-error region 357 is combined with the refined region data 370 from the previous stage 362 to generate combined region data, shown here as combined refined-high-error and middle-error region data 494.

Refinement continues with the application of the middle-error stage 365 to the combined refined-high-error and middle-error region data 494 to re-generate refined region data 370 (shown here as a combination of the refined middle-error region $\mathcal{L}^\mathcal{M}$ and twice-refined high-error region $\mathcal{L}^\mathcal{H}$. The combined low-error mask 492 is applied to the candidate interpolated intermediate frame 352 to generate low-error region 358, which is combined with the refined region data 370 to generate further combined region data, shown here as combined refined-high-and-middle-error and low-error region data 496.

The third stage of refinement is then applied. The low-error stage 366 is applied to the combined refined-high-and-middle-error and low-error region data 496 to re-generate the refined region data 370 (shown here as a combination of the low-error region $\mathcal{L}^\mathcal{L}$, twice-refined middle-error region $\mathcal{L}^\mathcal{M}$, and thrice-refined high-error region $\mathcal{L}^\mathcal{H}$). This final version of the refined region data 370 is used as the basis for the final refined interpolated intermediate frame 376 created as the output of the MAR-net 400 of the video frame interpolation system 262.

Figure 5:
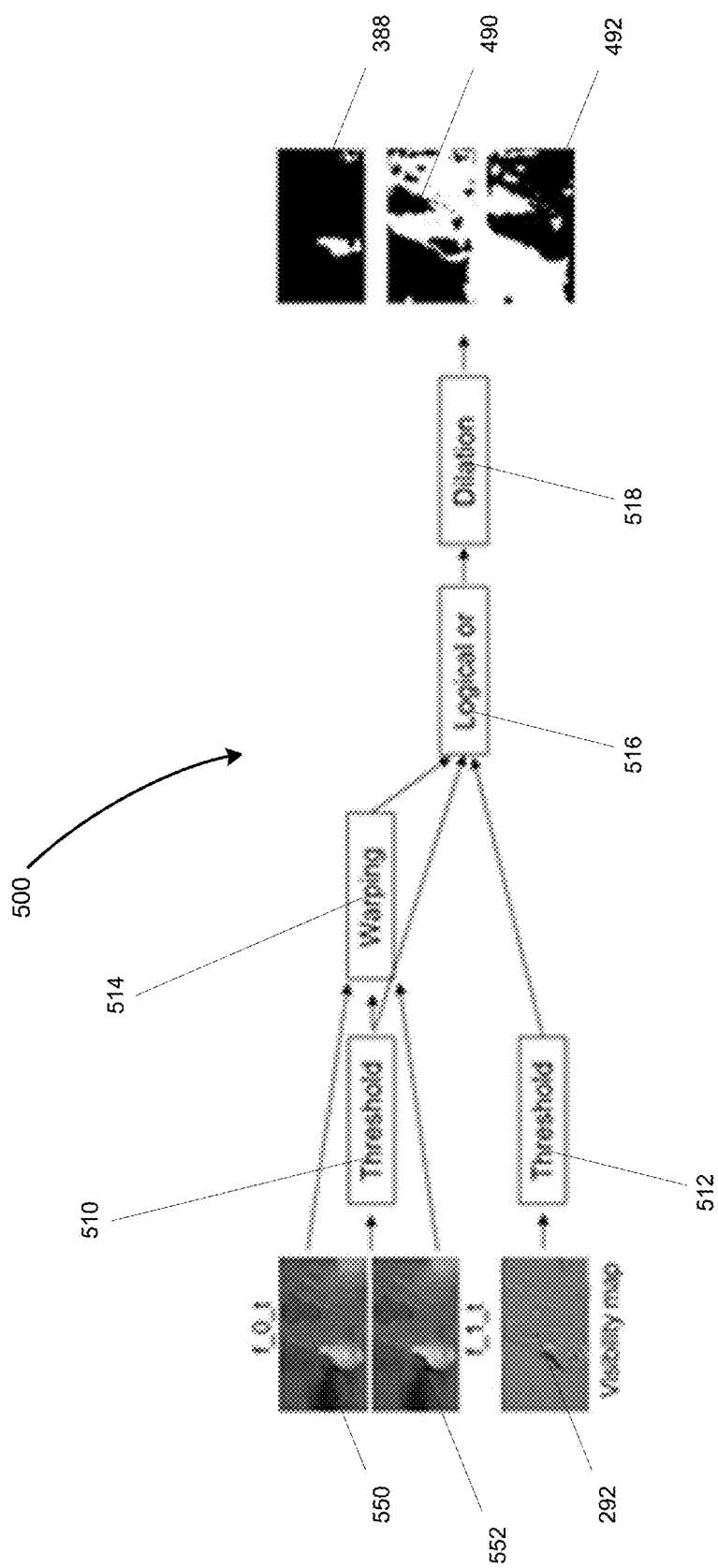
FIG. 5 is a flowchart showing the operation of a mask generation method used by a video frame interpolation system in accordance with one example embodiment of the present disclosure.

The generation of the masks used as inputs to the MAR-Net 400 may be implemented in different ways depending on, among other things, the nature of the difference data 284. FIG. 5 shows an example mask generation method 500 implemented by the mask generation instructions 266 of the video frame interpolation system 262. The mask generation method 500 generates three binary masks corresponding to a high-error region (combined high-motion mask 388), a middle-error region (combined middle-error mask 490), and a low-error region (combined low-error mask 492) of the optical flow map 290 and therefore of the candidate interpolated intermediate frame 352.

Given the candidate interpolated intermediate frame 352, the best way to improve the candidate interpolated intermediate frame 352 is to explicitly refine the areas with high errors. Relative to other motion types, global motion (e.g. camera motion) can be easily captured, as the motion vector across the whole candidate interpolated intermediate frame 352 is quite uniform. In contrast, moving objects in the scene not only amplify the motion length, but also have diverse motion directions compared to the global motion produced by e.g. camera motion.

For this reason, errors are more likely accumulated within and near regions containing moving objects. To locate these regions, the optical flow map 290 and the occlusion map 292 may be used. The magnitude of the optical flow map 290 and the occlusion map 292 (such as those computed by the FE-Net 610 described below) provide a very strong prior probability for the error in frame interpolation. With proper thresholding on the magnitude of the optical flow, the mask generation method 500 is able to locate the regions with high interpolation errors.

FIG. 5 shows the generation of three levels of motion masks, consisting of several processing steps. First, the system 205 computes the magnitude of the two-dimensional vectors of the optical flow map 290 (shown here as forward optical flow map 550 and backward optical flow map 552) as described above. The system 205 then applies different threshold values to generate three initial binary masks corresponding to high, middle, and low motion pixel regions of the candidate interpolated frame 352 (as described at step 306 of method 300). These thresholds are shown in FIG. 5 as thresholding step 510 applying a high-motion threshold, middle-motion threshold, and low-motion threshold to segment the candidate interpolated frame 352 into high-, middle-, and low-motion regions respectively.

The initial binary masks are then warped at stage 514 to cover the destination regions, as described at step 307 of method 300.

The final combined masks 388, 490, 492 are generated as the union (logical OR) 516 of the initial mask and warped mask (as described at step 308 of method 300), followed by a dilation operation to cover some neighbor pixels usually affected by motion (as described at step 308 of method 300).

In this embodiment, a visibility or occlusion threshold 512 is applied using the occlusion map 290 to create detect occluded regions of the candidate interpolated frame 352. The occlusion regions are included in the union operation 514 to include them within the high motion region.

Applying all the above steps of processing, the system 205 will finally obtain three binary motion masks 388, 490, 492 as shown in FIG. 5.

Video Frame Interpolation—Flow Estimation Neural Network

In some embodiments, the video frame interpolation method system 262 may further comprise a flow estimation instructions 264 for a flow estimation method 600 that is performed by flow estimation neural network (FE-Net 610). The FE-Net 610 generates the candidate interpolation intermediate frame 352, the optical flow map 290, and the occlusion map 292.

Figure 6:
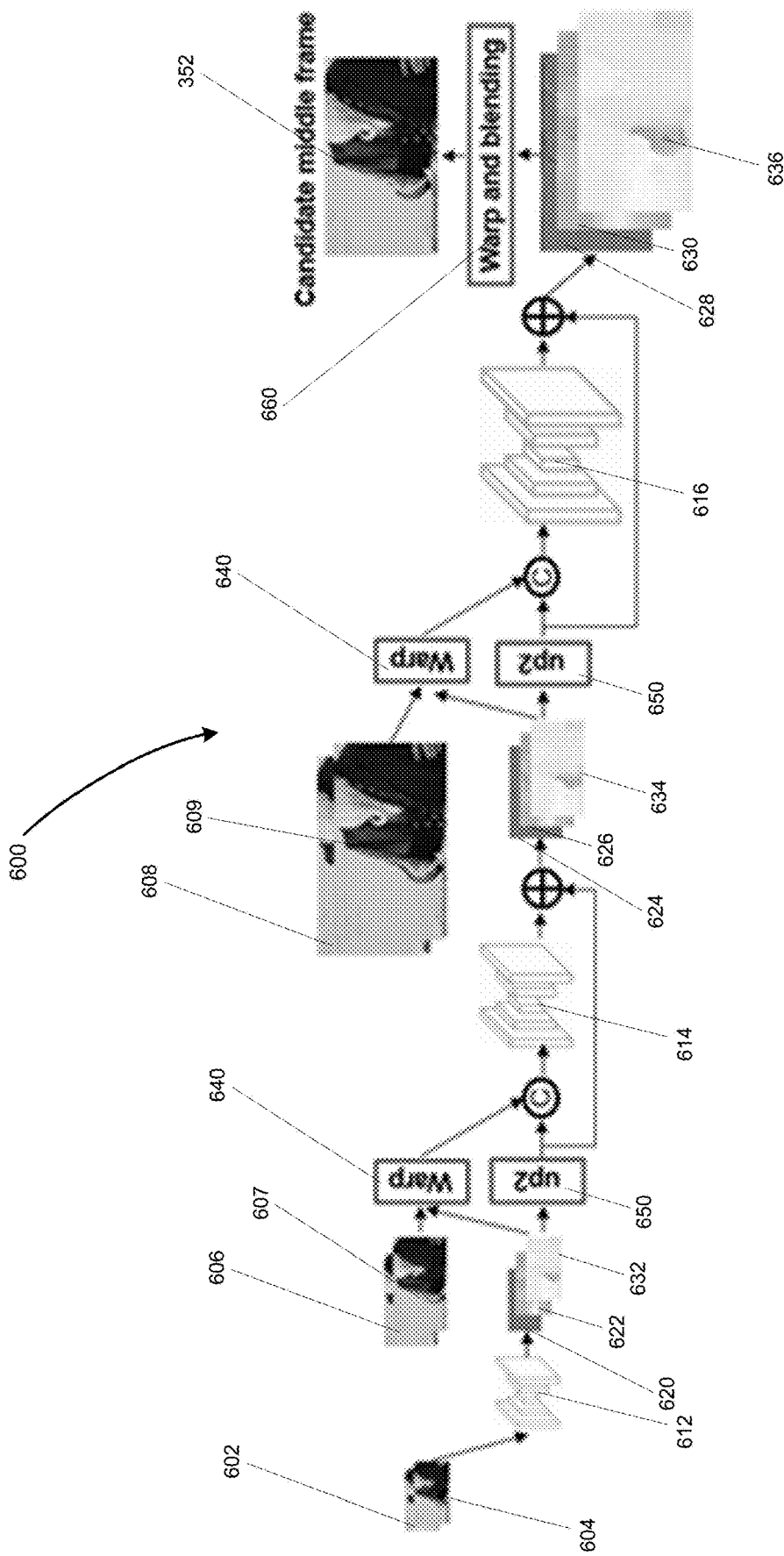
FIG. 6 is a diagram of a flow estimation workflow of an example multi-stage cascading flow estimation neural network (FE-Net) of the video frame interpolation system in accordance with one example embodiment of the present disclosure.

FIG. 6 shows the flow estimation workflow 600 of an example multi-stage cascading flow estimation neural network (FE-Net) 610. The FE-Net 610 consists of three levels of processing or stages 612, 614, 616 for computing optical flow. Given a sequence of frames of a video (i.e. first frame 286 and second frame 288) with the resolution of N, in the first layer (first stage 612), a low or base frame resolution of N/4 is processed, in the form of base-resolution first frame 602 and base-resolution second frame 604, which correspond to a ¼ resolution down-sampled version of the first frame 286 and second frame 288 respectively. This base-resolution first stage processing is followed by the second level (second stage 614), which refines the optical flow of the first level by using frames with N/2 resolution: a next higher-resolution first frame 606 and next higher-resolution second frame 607, which correspond to a ½ resolution down-sampled version of the first frame 286 and second frame 288 respectively. The third level refines optical flow obtained from the second level using the original size of the frame (N): a next higher-resolution first frame 608 and next higher-resolution second frame 609, which correspond to a full-resolution version of the first frame 286 and second frame 288 respectively.

In some embodiments, each stage 612, 614, 616 of the FE-Net 610 uses the same structure as existing neural networks, such as U-Net (described in detail below), for all levels. Starting from the coarsest level 612, the flow estimation workflow 600 computes an initial optical flow by processing N/4 resolution to capture large displacement motion, then the next two finer levels progressively compute the corresponding residual to compensate for local, increasingly subtle motion.

At each stage of the example FE-Net 610, the FE-Net stage computes bidirectional optical flow between the pair of consecutive frames (e.g. base-resolution first frame 602 and base-resolution second frame 604 at first stage 612). This generates the optical flow map 290. Here, first stage 612 computes a base-resolution optical flow map shown here as forward optical flow map 620 and backward optical flow map 622. These base-resolution forward optical flow map 620 and base-resolution backward optical flow map 622 are up-sampled by an up-sampling operation 650 (in this case, a 2× up-sampling operation, to go from N/4 to N/2 or from N/2 to N) before being propagated to the next stage.

Beginning at the second stage 614, the workflow 600 includes a warping operation 640 on each of the two current input frames according to the optical flow of the previous stage to obtain two initial estimates of the intermediate frame (not shown). After these two initial estimates of the intermediate frame are processed by the current stage (e.g. second stage 614), the output is combined with the up-sampled optical flow map from the previous stage to generate a successively higher-resolution optical flow map (e.g., half-resolution optical flow maps half-resolution forward optical flow map 624 and half-resolution backward optical flow map 662 at second stage 614, and full-resolution optical flow maps full-resolution forward optical flow map 628 and full-resolution backward optical flow map 630 at third stage 616).

Warping is performed by copying the value of each pixel in the input frame to the corresponding coordinate (obtained based on optical flow) in the output frame. From the warping, the system 205 obtains two warped frames from each initial pair of candidate frames.

Along with the optical flow, a visibility or occlusion map 292 is also computed at each scale as a blending mask. The first stage 612 computes a base-resolution occlusion map 632, second stage 614 computes a next higher-resolution occlusion map (half-resolution occlusion map 634), and third stage 616 computes a further next higher-resolution occlusion map (full-resolution occlusion map 636).

The final occlusion map (here, full-resolution occlusion map 636) is applied as a blending mask after the final stage (here, third stage 616) to fuse the two warped frames into a single frame. This fused frame is used, with or without modification, by the mask generation method 500 and MAR-Net 400 of the video frame interpolation system 262 as the candidate interpolated intermediate frame 352.

Similarly, the final optical flow map (here, bidirectional full-resolution optical flow maps 628 and 630) and final occlusion map (here, full-resolution occlusion map 636) may be used, with or without modification, as the optical flow map 290 and occlusion map 292 used by the mask generation method 500 and candidate intermediate frame refinement method 300 of the system 262.

Figure 7:
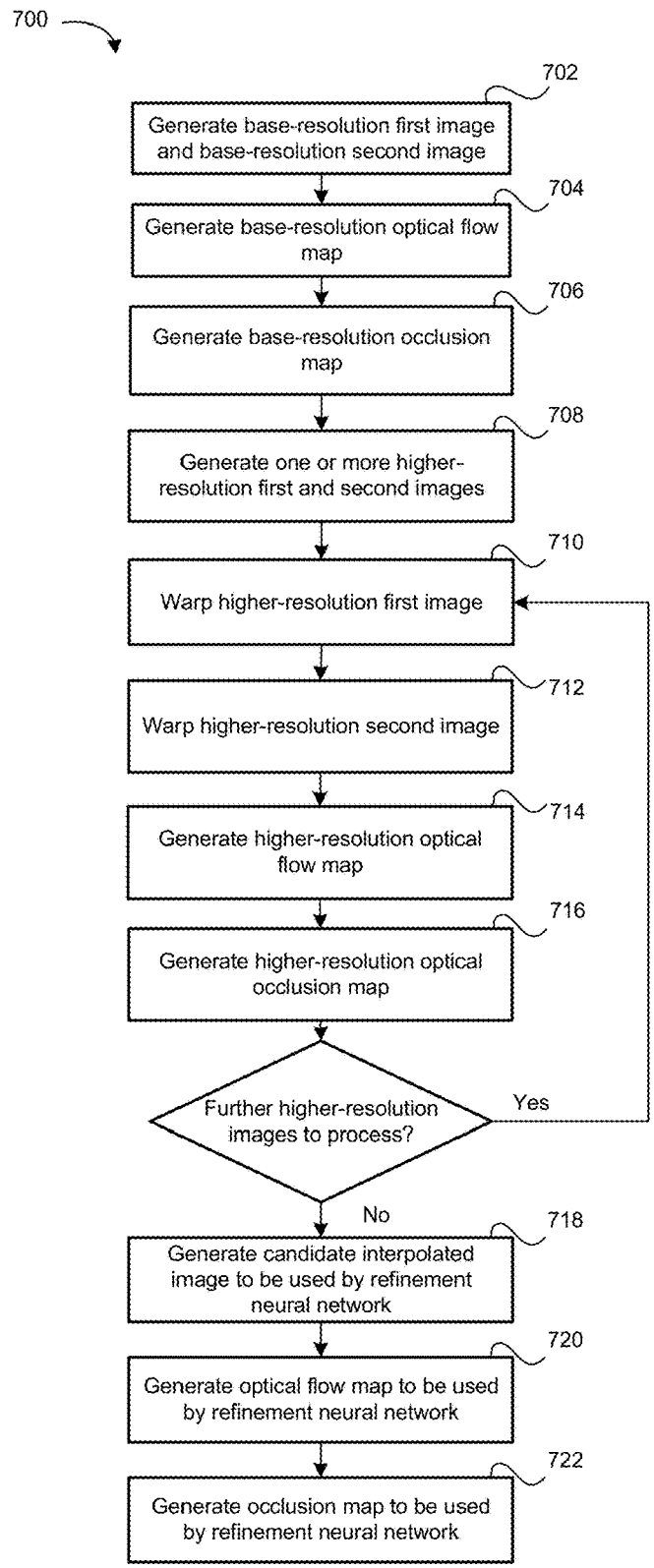
FIG. 7 is a flowchart showing an example flow estimation method performed by a flow estimation neural network (FE-Net) in accordance with one example embodiment of the present disclosure.

FIG. 7 is a flowchart showing an example flow estimation method 700 using a flow estimation neural network (FE-Net) 610 according to an example embodiment of the frame interpolation system 205. The steps of flow estimation method 700 correspond to the operation in flow estimation workflow 600.

In method 700, the FE-Net 610 (such as a multi-stage cascading flow estimation neural network as shown in FIG. 6) is used to generate the candidate interpolated intermediate frame 352, the optical flow map 290, and the occlusion map 292 used by other parts or steps of the video frame interpolation system 262. The method 700 receives a first frame 286 and second frame 288, such as two consecutive frames of a video, as input.

At step 702, a base-resolution first frame 602 is generated based on the first frame 286 and a base-resolution second frame 604 is generated based on the second frame 288, as described with reference to FIG. 6 above.

At step 704, a first stage 612 of the multi-stage cascading flow estimation neural network 610 is applied to generate a base-resolution optical flow map 620, 622 based on the base-resolution first frame 602 and base-resolution second frame 604 as described above with respect to the method 600 of FIG. 6.

At step 706, a base-resolution occlusion map 632 is generated based on the base-resolution first frame 602 and base-resolution second frame 604 as described above with respect to the method 600 of FIG. 6.

At step 708, one or more pairs of increasingly higher-resolution first frames (606 at stage 2, 608 at stage 3) and second frames (607 at stage 2, 609 at stage 3) are generated based on the first frame 286 and second frame 288 respectively.

Each of one or more subsequent stages (e.g. 614, 616) of the multi-stage cascading flow estimation neural network 610 are applied to each of the pairs of increasingly higher-resolution first and second frames (606 and 607 at stage 2, 608 and 609 at stage 3). This application of each neural network stage 614, 616 comprises four steps. At step 710, a first warped frame is generated by warping the higher-resolution first frame (606 at stage 2, 608 at stage 3) using the optical flow map generated using the previous flow estimation neural network stage (620,622 at stage 2, 624,626 at stage 3). At step 712, a second warped frame is generated by warping the higher-resolution second frame (607 at stage 2, 609 at stage 3) using the optical flow map generated using the previous flow estimation neural network stage (620,622 at stage 2, 624, 626 at stage 3). At step 714, a higher-resolution optical flow map (624,626 at stage 2, 628,630 at stage 3) is generated based on the first warped frame and second warped frame. And at step 716, a higher-resolution occlusion map (634 at stage 2, 636 at stage 3) is generated based on the first warped frame and second warped frame.

Once a final stage (e.g. third stage 616 in the embodiment of FIG. 6) of the multi-stage cascading flow estimation neural network 610 has been applied to generate a final first warped frame, final second warped frame, final optical flow map (e.g. 628,630), and final occlusion map (e.g. 636), steps 718-722 are executed. At step 718, the candidate interpolated intermediate frame 352 which is to be used by the refinement neural network (e.g. MAR-Net 400) is generated by fusing the final first warped frame and the final second warped frame using the final occlusion map (e.g. 636) as a blending map. At step 720, the optical flow map 290 which is to be used by the refinement neural network 360 is generated based on the final optical flow map (e.g. 628,630). At step 722, the occlusion map 290 which is to be used by the refinement neural network 360 is generated based on the final occlusion map (e.g. 636).

The refinement neural network (e.g., MAR-Net 400) and flow estimation neutral network 610 may be implemented using a number of known structures for neural networks. In some embodiments, one or both comprise light-weighted neural networks. In some embodiments, one or both are implemented using the U-Net neural network, a convolutional neural network architecture developed for biomedical frame segmentation at the Computer Science Department of the University of Freiburg, Germany (described at https://lmb.informatik.uni-freiburg.de/people/ronneber/u-net/ and hereby incorporated by reference). In other embodiments, the flow estimation neural network 610 may be implemented using alternate known structures for flow estimation, such as the Super SloMo architecture (described at https://arxiv.org/abs/1712.00080 and hereby incorporated by reference).

In some embodiments, the MAR-Net 400 comprises a machine learning model such as a convolutional neural network (CNN). A CNN normally has input(s) as images/video sequences and corresponding desired output(s). A typical CNN model consists of convolutional layers, pooling layers, fully connected layers, etc. The structure, layers and the output of a CNN highly depends on the tasks that the CNN is performing. For each of the convolutional layers, the goal is to learn parameters of filters (kernels) to extract different features from the input and pass them to the next layer. To train a CNN to learn a model, normally the input is passed forward through the layers of the CNN to compute an output based on the input data and the current status of filters, then based on the designed loss function, back propagation is performed by updating the weights in each kernel (filter) based on the level of error in the output or the level of error propagated from the output through the layers after the layer of each filter. When the CNN is trained, the model is learned and the weights of the CNN are frozen for a testing/inference stage. During testing/inference, the CNN only performs the forward pass to generate the output, without back propagation.

Figure 9:
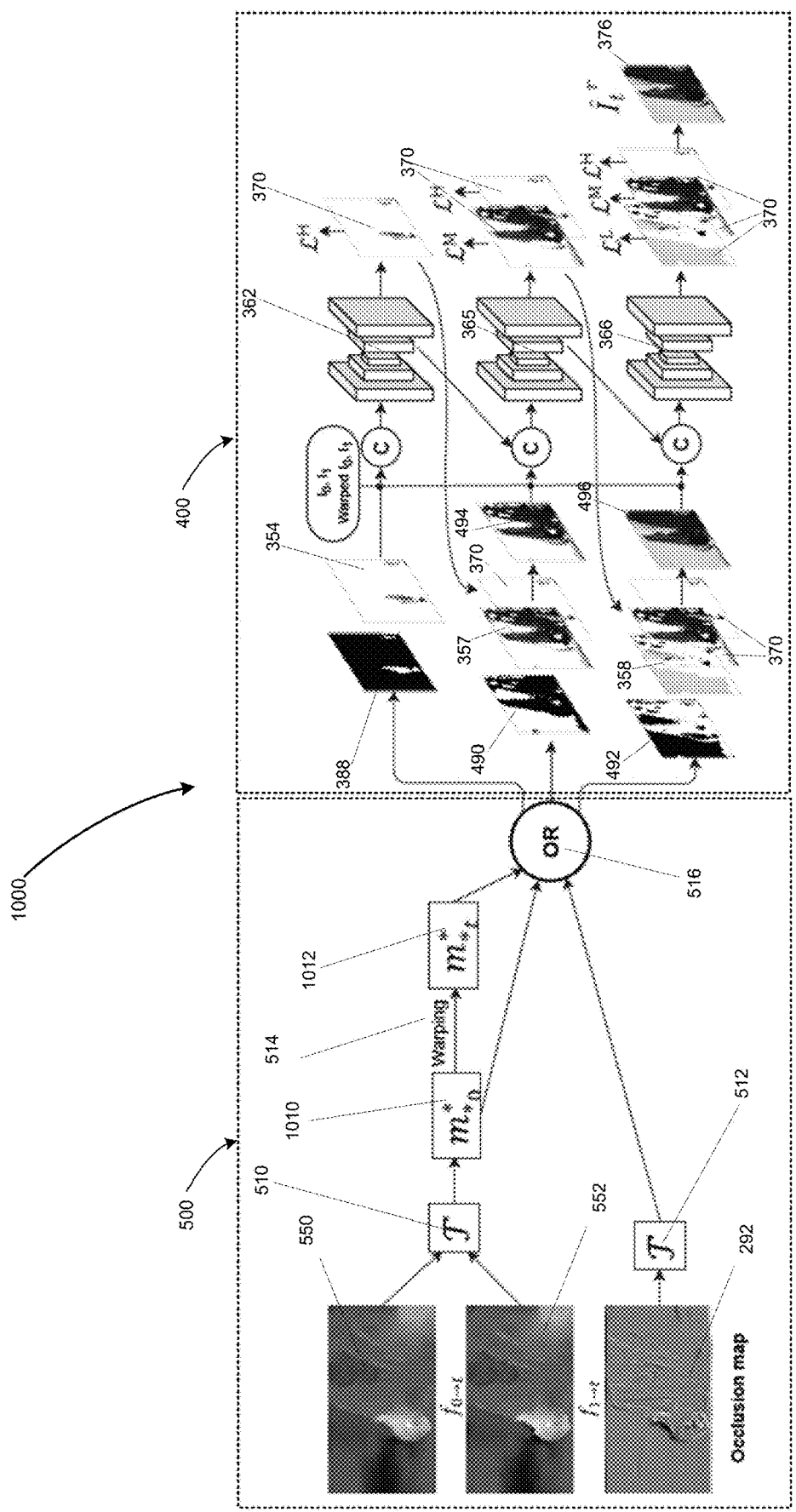
FIG. 9 is a diagram showing the mask generation method of FIG. 5 and the candidate interpolated intermediate frame refinement method of FIG. 3 in accordance with one example embodiment of the present disclosure.

In an example embodiment, the Vimeo90K dataset (see Tianfan Xue, Baian Chen, Jiajun Wu, Donglai Wei, and William T Freeman, *Video enhancement with task-oriented flow*, International Journal of Computer Vision (IJCV), 127(8):1106-1125, 2019, hereby incorporated by reference) is adopted to train the FE-Net 610. The Vimeo90K dataset contains 51,312 triplets for training. Each triplet consists of 3 consecutive frames with fixed resolution of 256×448. The FE-Net 610 may be trained to learn a model that synthesizes the candidate interpolated intermediate frame 362. For data argumentation, the frames may be randomly flipped horizontally and vertically, and the temporal order of the whole sequence may be reversed. The FE-Net 610 may in some embodiments be trained using Adam optimizer (Diederik P. Kingma and Jimmy Ba, *Adam: A method for stochastic optimization*, arXiv preprint arXiv:1412.6980, 2014, hereby incorporated by reference). The FE-Net 610 may in some embodiments first be trained with an initial learning rate equal to $10^{-4}$, which is then reduced by a factor of 10 when the loss plateaus. After the FE-Net 610 is trained, the weights are frozen and training begins on the refinement neural network (e.g., MAR-net) 400 with a learning rate of $10^{-4}$ for 10 epochs. The whole combined FE-MAR Net 900, as described below with reference to FIG. 9, is then fine-tuned with a learning rate equal to $10^{-5}$ until convergence.

Different embodiments may use various functions for optimizing the MAR-Net 400. In some embodiments, to draw more attention to local motion within higher-error regions, a motion-controlled loss function may be used, such as:

$$\mathcal{L}_{mc} = \sum_{i=0}^{2} \sum_{j=0}^{i} \frac{\|M_j \odot (I_i^t - I_i^{gt})\|_1}{\|M_j\|_1}$$

in which i is the level or stage of the MAR-Net 400 (e.g. stage 362=1, stage 365=2, stage 366=3); $M_j$ is the mask (e.g. 388,490,492) applied at level j, and $I'_i$ and $I_i^{gt}$ are the refined frame and ground truth frame respectively at level i. This equation may be reformulated in embodiments using high, middle, and low error regions (3 stages of the MAR-Net) as:

$$\mathcal{L}_{mcc} = \sum_{j=1}^{3} \sum_{z \in H,M,L} \frac{\|M^z \odot (\hat{I}_r^j - I_{gt})\|_1}{\|M^z\|_1}$$

where $M^Z$ are the motion masks, $\hat{I}_r^j$ is the refined regions at level j and ⊙ denotes element-wise multiplication. Note that for first and second stage, the loss terms are eliminated when the masks are not presented.

Blurriness is often observed in the regions with large motions and rich textures. To address this problem, some embodiments may consider a high level feature-based perceptual loss. In some embodiments, instead of directly minimizing the feature difference, the technique from (Muhammad Waleed Gondal, Bernhard Scholkopf, and Michael Hirsch, *The unreasonable effectiveness of texture transfer for single frame super-resolution*, in Proceedings of the European Conference on Computer Vision (ECCV), pages 0-0, 2018, incorporated herein by reference) may be used to apply a motion controlled texture loss:

$$\mathcal{L}_{style} = \|G(\phi(M^H \odot \hat{I}_r)) - G(\phi(M^H \odot \hat{I}_{gt}))\|_2$$

where $G(F) = FF^T$ is the Gram matrix. This cost function may be applied to constrain only the high IE regions, as blurriness yields high error when the ground truth is sharp.

The loss function used to optimize the FE-Net 610 may in some embodiments be:

$$\mathcal{L}_r = \frac{1}{k} \sum_{k=1}^{K} \|\hat{I}_t^k - I_{gt}^k\|_1$$

where $\hat{I}_t^k$ denotes the ground truth and $I_{gt}^k$ denotes the middle frame computed by:

$$\hat{I}_t^k = v^k \odot g(I_0, f_{0 \to t}^k) + (1-v^k) \odot g(I_1, f_{0 \to t}^k)$$

at scale level k, where g( ) is a bilinear warping function applied to an frame I and an optical flow map f. In this equation, $I_0$ and $I_1$ are the starting and ending frames (as opposed to $I_1$ and $I_2$ in prior equations above); $I_t$ is the interpolated middle frame; and foot is the forward optical flow map from the starting frame to the interpolated middle frame.

FIG. 8 shows the video frame interpolation system 262 comprising a combined a combined FE-MAR Net 900 incorporating both a MAR-Net 400 and FE-Net 610 described above, working together to create a final refined interpolated intermediate frame 376 based on inputs of a first frame 286 and second frame 288. The top row of FIG. 8 shows a simplified block diagram of the flow estimation method 700 from FIG. 7. The bottom row of FIG. 8 shows (on the left) a simplified block diagram of a mask generation module 501 implementing the mask generation method 500 of FIG. 5, taking as its inputs the masks 628, 630, 636 of the flow estimation method 700. The bottom row of FIG. 8 also shows (on the right) a simplified block diagram of a frame refinement module 301 implementing the frame refinement method 300 of FIG. 3, taking as its inputs the masks 930 of the mask generation method 500 as well as the candidate interpolated frame 352 of the flow estimation method 700.

In keeping with the descriptions above, the FE-Net 610 of the combined FE-MAR Net 900 receives the first frame 286 and second frame 288 as input, and generates an optical flow map 290 and occlusion map 292 (shown here as final optical flow maps 628, 630 and final occlusion map 636) using the first frame 286 and second frame 288. The optical flow map 290 and the occlusion map 292 are passed to the mask generation method 500 as well as to a pixel remapping operation 910 followed by a blending operation 920, corresponding to the warp and blending operations 660 of flow estimation workflow 660. These two operations 910, 920 result in the candidate interpolated intermediate frame 352, which is passed as an input to the refinement method 300.

The mask generation method 500 receives the optical flow map 290 and occlusion map 290 from the FE-Net 610, and generates a set of motion masks 930 such as masks 388, 490, 492 of FIG. 5.

After the mask generation 500 method has completed the generation of the set of motion masks 930, the remaining portion of the frame refinement module 301 implementing the MAR-Net 400 receives as inputs the set of motion masks 930 as well as the candidate interpolated intermediate frame 352. The frame refinement module 301 applies the set of masks 930 to the candidate interpolated intermediate frame 352 to identify the various high- and successively lower-error regions, which are provided to the MAR-Net 400. The MAR-Net 400 processes each region and generates as its output the final refined interpolated intermediate frame 376.

In some embodiments, the set of motion masks 930 used to segment the frame into high, middle and low interpolation error (IE) are generated using the forward optical flow map at T=0 (starting frame) as follows:

$$\begin{cases} m_{f,0}^H = 1 & \text{if } F_{0 \to t} \geq \tau_0^H \\ m_{f,0}^M = 1 & \text{if } \tau_0^H > F_{0 \to t} \geq \tau_0^M \\ m_{f,0}^L = 1 & \text{if } \tau_0^M > F_{0 \to t} \\ m_{f,0}^* = 0 & \text{otherwise} \end{cases}$$

where capital F represents the magnitude of optical flow; H, M, L are high, middle and low IE levels respectively; the subscript f,0 means the mask generated by forward optical flow at T=0; τ is the threshold value; and * denotes all cases of H, M, L.

In some embodiments, the warping function applies the optical flow as follows:

$$m^*_{f,0 \to t} = g(m^*_{f,0}, f_{0 \to t})$$

with a similar procedure used to generate $m^*_{f,1}$ and $m^*_{f,1 \to t}$.

In some embodiments, the occlusion map $m^V$ may be generated to satisfy the following condition:

$$m^V = \left\{ 1 \middle\| v - \frac{1}{2} \middle\| \geq \frac{1}{4}, 0 \middle\| v - \frac{1}{2} \middle\| < \frac{1}{4} \right\}$$

In some embodiments, the dilation operation is carried out for each IE level (e.g. high, middle, and low) by taking the union of all masks and dilating it with a 5×5 structuring element to generate the final motion masks 930:

$$M^H = d(m_{f,0}^H \cup m_{f,0 \to t}^H \cup m_{f,1}^H \cup m_{f,1 \to t}^H \cup m^V)$$

$$M^M = d(m_{f,0}^M \cup m_{f,0 \to t}^M \cup m_{f,1}^M \cup m_{f,1 \to t}^M)$$

$$M^L = d(m_{f,0}^L \cup m_{f,0 \to t}^L \cup m_{f,1}^L \cup m_{f,1 \to t}^L)$$

To emphasize enhancement of details, residual learning may be employed in some embodiments for the MAR-Net 400 to learn the difference between $\hat{I}_t$ and ground truth. The MAR-Net 400 described herein is a lite-weighted neural network having a relative small number of learned parameters, which effectively reduces interpolation error. Thus, the structure of residual blocks described in (Seungjun Nah, Tae Hyun Kim, and Kyoung Mu Lee, *Deep multi-scale convolutional neural network for dynamic scene deblurring*, in Proceedings of the IEEE Conference on Computer Vision and Pattern Recognition, pages 3883-3891, 2017, incorporated herein by reference) may be followed to remove unnecessary components and set channel numbers to 32 and 48 for efficiency.

FIG. 9 shows a further example combined FE-Mar Net workflow 1000. In addition to steps and elements described above with respect to FIGS. 4 and 5, the workflow 1000 shows the initial binary mask $m^*_{*_0}$ 1010 warped by the warping operation 514 to create the warped binary mask $m^*_{*_f}$ 1012. The left side of FIG. 9 corresponds to FIG. 5, while the right side of FIG. 9 corresponds to FIG. 4.

Experimental Data

A number of experiments have been carried out to test the proposition that interpolation error is highly correlated with optical flow in frame interpolation tasks. Outputs from an example FE-Net implementation applied to the Vimeo90K test set (http://toflow.csail.mit.edu/, incorporated herein by reference) were evaluated to demonstrate that the optical flow and the interpolation error are highly correlated. Specifically, $\hat{I}_r$ was segmented into regions by setting a threshold to the magnitude of optical flow. Then, the PSNR of the region and the whole frame were compared to show the change in IE. As noted above, uniform global motion (e.g. camera motion) can be well handled by a coarse-to-fine FE-Net even with larger uniform motion. Only the regions with optical flow above the mean value across the whole frame are considered in order to eliminate the impact from uniform motion.

Figure 10:
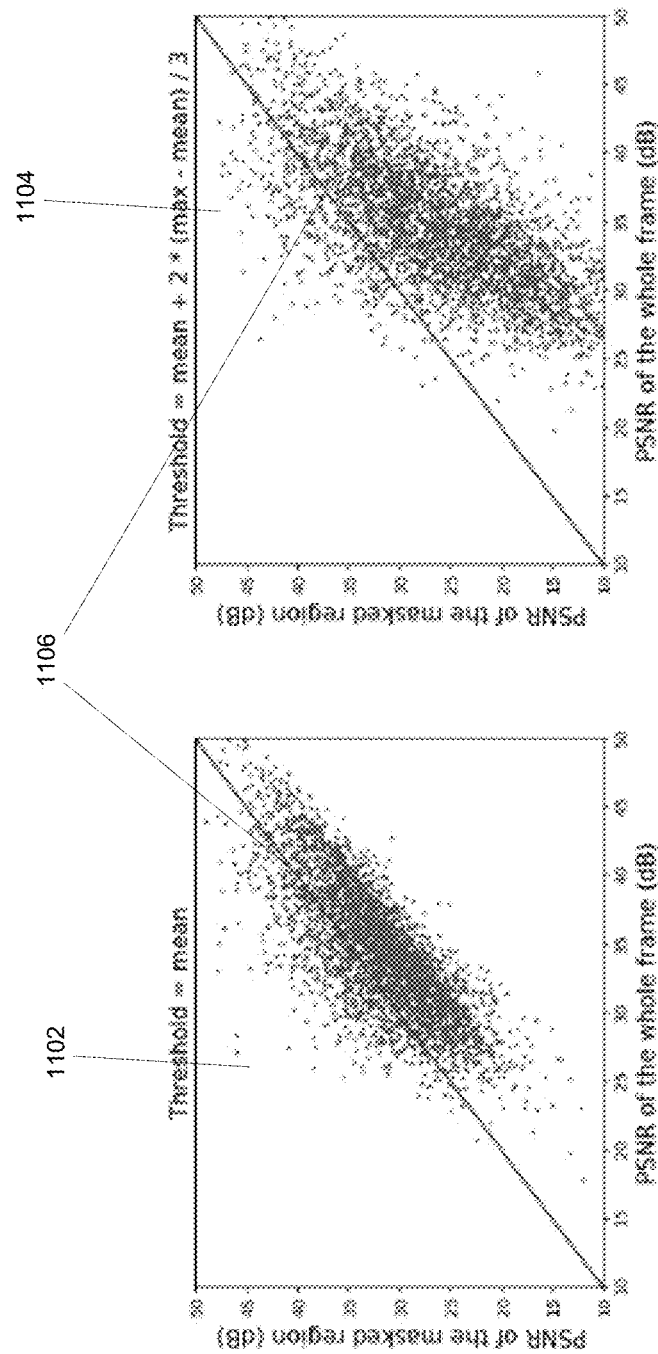
FIG. 10 is a pair of scatter plots of experimental data showing correlation between optical flow and interpolation error.

Two thresholds for comparison were set: mean and mean+ ⅔ (max-mean). FIG. 10 shows the scatter plots of regional PSNR versus the PSNR of the whole frame. The left plot 1102 shows the data using mean; the right plot 104 shows the data using max-mean. It is expected that most of the regions with optical flow beyond the mean value (i.e. below the diagonal line 1106 where PSNR of the region is equal to PSNR of the entire frame) will experience a drop in PSNR. Similarly, when filtering out the regions with optical flow closer to the mean, more points are dispersedly distributed below the diagonal line 1106. Even with very high PSNR for the whole frame, there still can be a significant decrease in PSNR for the regions with high motion. This observation verifies the premise about the correction between optical flow and interpolation error.

Testing Data

An example implementation of an FE-Mar Net in accordance with the described embodiments has been tested against other known techniques, with measurements of PSNR (Peak Signal-to-Noise Ratio, measured in dB, with higher being better), SSIM (Structural Similarity, measured from 0.0 to 1.0, with higher being better), and IE (Interpolation Error, with lower being better). The results are set out in the table below:

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-read-

|  | Vimeo90K | | UCF101 (w/o mask) | | | UCF101 (w/ mask) | | | Middlebury |
|---|---|---|---|---|---|---|---|---|---|
| Methods | PSNR | SSIM | PSNR | SSIM | IE | PSNR | SSIM | IE | IE |
| DVF | 31.54 | 0.9462 | 34.11 | 0.941 | 5.47 | 29.37 | 0.861 | 16.37 | 4.71 |
| Zoom | — | — | 34.14 | 0.941 | 5.47 | 29.38 | 0.861 | 16.37 | — |
| CyclicGen | 32.10 | 0.9222 | 35.11 | 0.949 | 5.06 | 30.40 | 0.880 | 15.23 | 3.04 |
| ToFlow | 33.73 | 0.9519 | 34.58 | 0.947 | 5.51 | 30.09 | 0.877 | 15.42 | 2.56 |
| SepConv-L1 | 33.79 | 0.9591 | 34.69 | 0.945 | 5.40 | 30.03 | 0.869 | 15.78 | 2.27 |
| SuperSlowMo | 34.35 | 0.9567 | 34.75 | 0.947 | 5.37 | 30.22 | 0.880 | 15.18 | 2.15 |
| MEMC-Net | 34.40 | 0.9621 | 35.01 | 0.950 | 5.14 | 30.34 | 0.881 | 15.31 | 2.12 |
| DAIN | 34.71 | 0.9639 | 34.99 | 0.949 | 5.12 | 30.31 | 0.879 | 15.25 | 2.04 |
| FE-MAR Net | 35.34 | 0.9654 | 35.24 | 0.951 | 5.03 | 30.61 | 0.886 | 14.81 | 1.94 | able medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computing system for video frame interpolation, comprising:
 a processor system; and
 a memory coupled to the processor system, the memory tangibly storing thereon executable instructions that, when executed by the processor system, cause the computing device to:
  receive a candidate interpolated intermediate frame;
  receive difference data comprising at least one of an optical flow map and an occlusion map;
  process the difference data to estimate a high-error region and generate a mask for the high-error region and estimate one or more increasingly lower-error regions and generate a mask for each one of the one or more increasingly lower-error regions; and
  apply each mask to the candidate interpolated intermediate frame to refine each of the high-error region and increasingly lower-error regions separately to produce refined region data to generate a final refined interpolated intermediate frame.

2. The computing system of claim 1, wherein
 the difference data comprises an optical flow map; and
 identifying the high-error region and the one or more increasingly lower-error regions comprises:
  generating a high-motion mask corresponding to a region of the optical flow map having optical flow magnitude over a predetermined highest optical flow threshold; and
  generating one or more lower-motion masks corresponding to one or more regions of the optical flow map having optical flow magnitude over one or more predetermined lower optical flow thresholds.

3. The computing system of claim 2, wherein:
 the difference data further comprises an occlusion map; and
 identifying the high-error region and the one or more increasingly lower-error regions further comprises:
  generating a warped high-motion mask and one or more warped lower-motion masks based on warping the high-motion mask and the one or more lower-motion masks, respectively, using the optical flow map;
  generating a combined high-motion mask and one or more combined lower-motion masks based on a union of the high-motion mask and one or more lower-motion masks, respectively, with the warped high-motion mask and one or more warped lower-motion masks, respectively;
  detecting one or more occluded regions of the candidate interpolated intermediate frame based on the occlusion map;
  identifying the high-error region based on the combined high-motion mask, further including the one or more occluded regions; and
  identifying the one or more low-error regions based on the one or more combined lower-motion masks.

4. The computing system of claim 3, wherein generating the combined high-motion mask and the one or more combined lower-motion masks further comprises applying dilation to a boundary of each combined mask based on the optical flow map.

5. The computing system of claim 3, wherein warping a mask using the optical flow map to generate a warped mask comprises copying the value of each pixel in the mask to generate the value of a corresponding pixel, based on an optical flow vector of a corresponding coordinate of the optical flow map, of the warped mask.

6. The computing system of claim 3, wherein the instructions, when executed by the processor system, further cause the video frame interpolation system to generate the candidate interpolated intermediate frame, the optical flow map, and the occlusion map from a first frame and a second frame using a trained flow estimation neural network.

7. The computing system of claim 6, wherein the trained flow estimation neural network generates the candidate interpolated intermediate frame, the optical flow map, and the occlusion map from the first frame and the second frame by:
 generating a base-resolution first frame based on a first frame and a base-resolution second frame based on a second frame;
 using a first stage of the multi-stage cascading flow estimation neural network to:
  generate a base-resolution optical flow map based on the base-resolution first frame and base-resolution second frame; and
  generate a base-resolution occlusion map based on the base-resolution first frame and base-resolution second frame;
 generating one or more pairs of increasingly higher-resolution first and second frames based on the first frame and second frame respectively;
 applying each of one or more subsequent stages of the multi-stage cascading flow estimation neural network to each of the pairs of increasingly higher-resolution first and second frames by:
  generating a first warped frame by warping the higher-resolution first frame using the optical flow map generated using the previous flow estimation neural network stage;

generating a second warped frame by warping the higher-resolution second frame using the optical flow map generated using the previous flow estimation neural network stage;

generating a higher-resolution optical flow map based on the first warped frame and second warped frame; and generating a higher-resolution occlusion map based on the first warped frame and second warped frame; and once a final stage of the multi-stage cascading flow estimation neural network has been applied to generate a final first warped frame, final second warped frame, final optical flow map, and final occlusion map:

generating the candidate interpolated intermediate frame by fusing the final first warped frame and the final second warped frame using the final occlusion map as a blending map;

generating the optical flow map based on the final optical flow map; and generating the occlusion map based on the final occlusion map.

8. The computing system of claim 1, wherein refining each of the high-error and increasingly lower-error regions comprises:

applying a high-error stage of a refinement neural network to a high-error portion of the candidate interpolated frame data corresponding to the high-error region, thereby generating refined region data; and for each increasingly lower-error region:
(a) generate combined region data based on the refined region data and a lower-error portion of the candidate interpolated frame data corresponding to the lower-error region; and
(b) apply an increasingly lower-error stage of the refinement neural network to the combined region data to re-generate the refined region data.

9. A method for frame interpolation, comprising:
receiving a candidate interpolated intermediate frame;
receiving difference data comprising at least one of an optical flow map and an occlusion map;
processing the difference data to estimate a high-error region and generate a mask for the high-error region and estimate one or more increasingly lower-error regions and generate a mask for each one of the one or more increasingly lower-error regions; and
applying each mask to the candidate interpolated intermediate frame to refine each of the high-error region and increasingly lower-error regions separately to produce refined region data to generate a final refined interpolated intermediate frame.

10. The method of claim 9, wherein
the difference data comprises an optical flow map; and
identifying the high-error region and the one or more increasingly lower-error regions comprises:
generating a high-motion mask corresponding to a region of the optical flow map having optical flow magnitude over a predetermined highest optical flow threshold; and
generating one or more lower-motion masks corresponding to one or more regions of the optical flow map having optical flow magnitude over one or more predetermined lower optical flow thresholds.

11. The method of claim 10, wherein:
the difference data further comprises an occlusion map; and
identifying the high-error region and the one or more increasingly lower-error regions further comprises:

generating a warped high-motion mask and one or more warped lower-motion masks based on warping the high-motion mask and the one or more lower-motion masks, respectively, using the optical flow map;

generating a combined high-motion mask and one or more combined lower-motion masks based on a union of the high-motion mask and one or more lower-motion masks, respectively, with the warped high-motion mask and one or more warped lower-motion masks, respectively;

detecting one or more occluded regions of the candidate interpolated intermediate frame based on the occlusion map;

identifying the high-error region based on the combined high-motion mask, further including the one or more occluded regions; and identifying the one or more low-error regions based on the one or more combined lower-motion masks.

12. The method of claim 11, wherein generating the combined high-motion mask and the one or more combined lower-motion masks further comprises applying a dilation operation to include some pixels near the mask boundaries.

13. The method of claim 11, wherein warping a mask using the optical flow map to generate a warped mask comprises copying the value of each pixel in the mask to generate the value of a corresponding pixel, based on an optical flow vector of a corresponding coordinate of the optical flow map, of the warped mask.

14. The method of claim 11, further comprising using a flow estimation neural network to generate the candidate interpolated intermediate frame, the optical flow map, and the occlusion map.

15. The method of claim 14, wherein using the flow estimation neural network to generate the candidate interpolated intermediate frame, the optical flow map, and the occlusion map comprises:

generating a base-resolution first frame based on a first frame and a base-resolution second frame based on a second frame;

using a first stage of the multi-stage cascading flow estimation neural network to:
generate a base-resolution optical flow map based on the base-resolution first frame and base-resolution second frame; and
generate a base-resolution occlusion map based on the base-resolution first frame and base-resolution second frame;

generating one or more pairs of increasingly higher-resolution first and second frames based on the first frame and second frame respectively;

applying each of one or more subsequent stages of the multi-stage cascading flow estimation neural network to each of the pairs of increasingly higher-resolution first and second frames by:
generating a first warped frame by warping the higher-resolution first frame using the optical flow map generated using the previous flow estimation neural network stage;
generating a second warped frame by warping the higher-resolution second frame using the optical flow map generated using the previous flow estimation neural network stage;
generating a higher-resolution optical flow map based on the first warped frame and second warped frame; and generating a higher-resolution occlusion map based on the first warped frame and second warped frame; and once a final stage of the multi-stage cascading flow estimation neural network has been applied to generate a final first warped frame, final second warped frame, final optical flow map, and final occlusion map:

generating the candidate interpolated intermediate frame used by the refinement neural network by fusing the final first warped frame and the final second warped frame using the final occlusion map as a blending map;

generating the optical flow map used by the refinement neural network based on the final optical flow map; and generating the occlusion map used by the refinement neural network based on the final occlusion map.

16. The method of claim 9, wherein refining each of the high-error and increasingly lower-error regions comprises:

applying a high-error stage of a refinement neural network to a high-error portion of the candidate interpolated frame data corresponding to the high-error region, thereby generating refined region data;

for each increasingly lower-error region:

generating combined region data based on the refined region data and a lower-error portion of the candidate interpolated frame data corresponding to the lower-error region; and applying an increasingly lower-error stage of the refinement neural network to the combined region data to re-generate the refined region data.

17. A non-transitory processor readable medium having tangibly stored thereon executable instructions that, when executed by a processor, cause the processor to perform the method of claim 9.

18. A non-transitory processor readable medium having tangibly stored thereon executable instructions that, when executed by a processor, cause the processor to perform the method of claim 10.

19. A non-transitory processor readable medium having tangibly stored thereon executable instructions that, when executed by a processor, cause the processor to perform the method of claim 11.

20. A non-transitory processor readable medium having tangibly stored thereon executable instructions that, when executed by a processor, cause the processor to perform the method of claim 15.

\* \* \* \* \*